United States Patent
Jung (10) Patent No.: US 6,421,231 B1
(45) Date of Patent: Jul. 16, 2002

(54) DISPLAY UNIT AND PORTABLE COMPUTER USING THE SAME

(75) Inventor: Hae-Soo Jung, Suwon (KR)

(73) Assignee: Samsung Electronics Co., Ltd., Suwon (KR)

( * ) Notice: Subject to any disclaimer, the term of this patent is extended or adjusted under 35 U.S.C. 154(b) by 0 days.

(21) Appl. No.: 09/525,326

(22) Filed: Mar. 13, 2000

(30) Foreign Application Priority Data

Mar. 13, 1999 (KR) .............................. 99-8511

(51) Int. Cl.[7] .............................. G06F 1/16; H05K 5/00
(52) U.S. Cl. .................. 361/681; 361/683; 349/58; 345/903; 345/905; 248/918
(58) Field of Search .................. 361/681, 683; 349/58, 60; 345/903, 905; 248/917–924

(56) References Cited

U.S. PATENT DOCUMENTS

| | | | |
|---|---|---|---|
| 5,379,182 A | * 1/1995 | Fujimori et al. ............. 361/681 |
| 5,587,817 A | 12/1996 | Miyamoto et al. |
| 5,631,756 A | 5/1997 | Itazawa |
| 5,680,183 A | 10/1997 | Sasuga et al. |
| 5,729,310 A | 3/1998 | Horiuchi et al. |
| 5,815,224 A | 9/1998 | Hasegawa et al. |
| 5,835,139 A | 11/1998 | Yun et al. |
| 5,872,606 A | 2/1999 | Kim |
| 5,946,061 A | * 8/1999 | Kurihara et al. ............. 349/58 |
| 5,986,726 A | 11/1999 | Murai |
| 6,002,582 A | * 12/1999 | Yeager et al. ............. 361/681 |
| 6,064,565 A | * 5/2000 | Ishihara et al. ............. 361/681 |
| 6,128,183 A | * 10/2000 | Uchiyama et al. ............. 361/681 |
| 6,202,256 B1 | * 3/2001 | Bovio et al. ............. 361/681 |
| 6,272,006 B1 | * 8/2001 | Lee ............. 361/681 |

FOREIGN PATENT DOCUMENTS

JP      5-150224   *  6/1993   .............. G06F/1/16

* cited by examiner

Primary Examiner—Darren Schuberg
Assistant Examiner—Lisa Lea-Edmonds
(74) Attorney, Agent, or Firm—Robert E. Bushnell, Esq.

(57) ABSTRACT

A display unit of a portable computer that is capable of using the same rear display case irrespective of the size of the display unit. A display unit of a portable computer has a flat panel display including a display zone at a front surface and both side walls having at least one hole thereon, a lower housing for incorporating the flat panel display where both side walls have at least one hole corresponding to at least one hole of the flat panel display, an upper housing coupled to the lower housing where an opening for showing the display zone is formed at the upper housing, at least one adjusting member for holding the flat panel display where the adjusting member is located between the lower housing and the flat panel display to fill up a gap between the lower housing and the flat panel display where the adjusting member has at least one hole thereon corresponding to at least one hole of the flat panel display, and a fixing member for holding the lower housing, the adjusting member and the flat panel housing together.

19 Claims, 9 Drawing Sheets

DISPLAY UNIT AND PORTABLE COMPUTER USING THE SAME

CLAIM OF PRIORITY

This application makes reference to, incorporates the same herein, and claims all benefits accruing under 35 U.S.C. §119 from an application entitled Display Unit and Notebook Computer Using the Unit earlier filed in the Korean Industrial Property Office on Mar. 13, 1999, and there duly assigned Ser. No.99-8511 by that Office.

BACKGROUND OF THE INVENTION

1. Field of the Invention

The present invention relates to a computer and, more particularly to a display unit of a portable computer that is capable of using the same rear display case irrespective of the size of the display unit.

2. Discussion of Related Art

Many portable computers use a liquid crystal display (LCD) device for displaying video images. The LCD device includes a liquid crystal panel, a back light unit and a driving circuit board. The back light unit has a luminescent lamp, a lamp housing having a U-shape and surrounding the lamp, light guide, a reflector reflecting the incidental light from the horizontal direction to the vertical direction, a protection sheet contacting the light guide, a first prism sheet and a second prism sheet set on the protecting sheet and condensing the incident light from the light guide to some direction, a diffuser diffusing the light from the first and second prisms to viewing area of the liquid crystal panel with a certain viewing angle, and support frame supporting these elements.

When the fluorescent lamp is turned on, the light from the source is reflected by the lamp housing surrounding the fluorescent lamp. The reflected light transmits through the cross-section toward the other side of the light-guiding plate as indicated by the arrows. Then, the light spreads all over the surface of the light-guiding plate and reaches the display area through the diffusion plate. At the same time, a thin film transistor formed on the liquid crystal panel controls a corresponding pixel according to the signals from the driving circuit to selectively transmit the light which collectively realizes the display of images on the display area.

Figure 1:
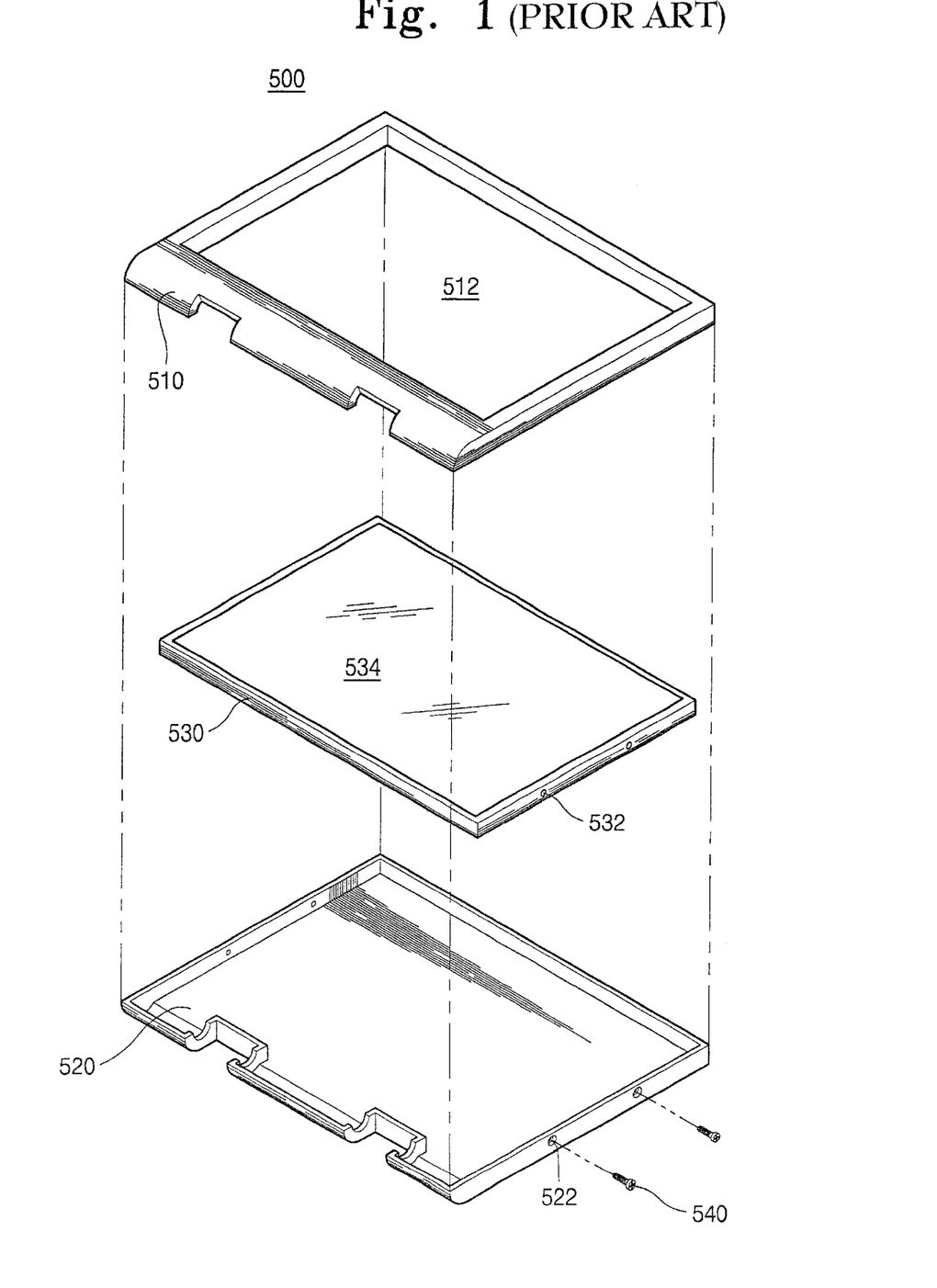
FIG. 1 is an exploded perspective view showing a conventional LCD display unit.
Figure 2:
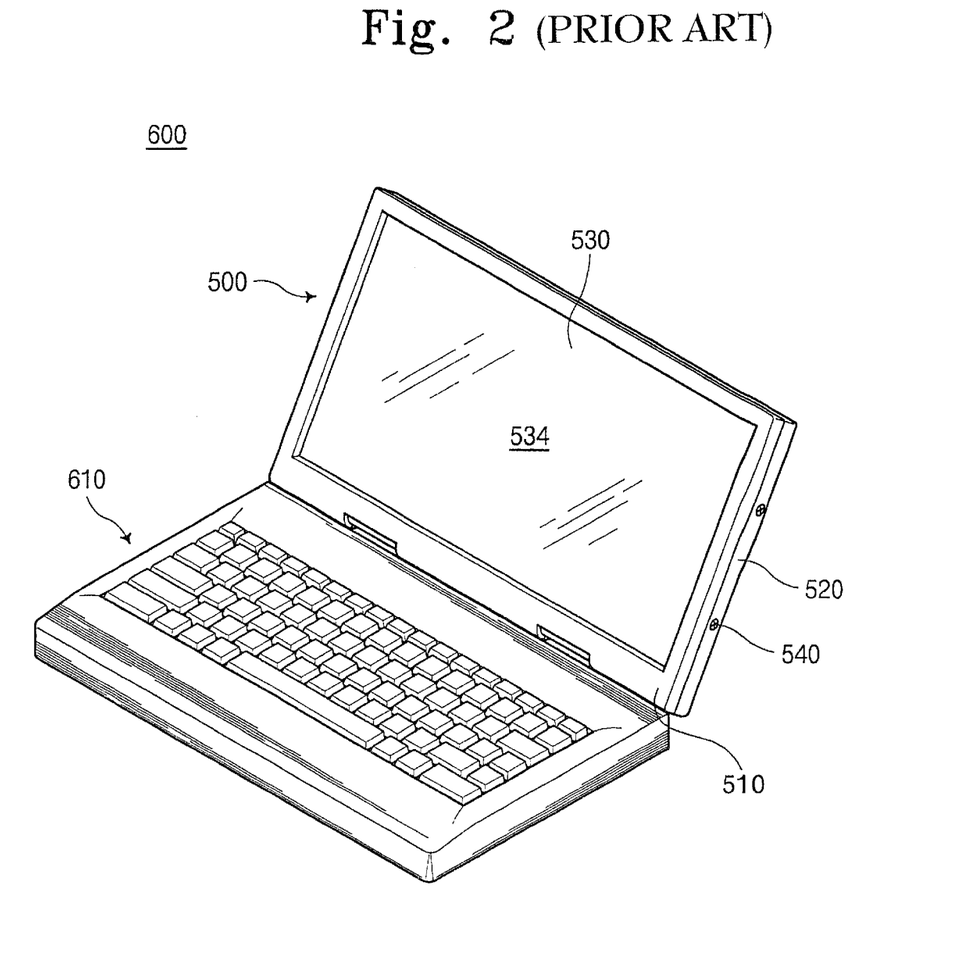
FIG. 2 is a perspective view showing a portable computer with the conventional LCD display unit.

An exemplar of the prior art is Yun et al. (U.S. Pat. No. 5,835,139, Computer Having Liquid Crystal Display Between Frames Attached at the Edges, Nov. 10, 1998) is illustrated in FIG. 1 and FIG. 2. Referring to FIGS. 1 and 2, a liquid crystal display device 500 has a front case 510, a rear case 520, and a liquid crystal panel 530. The liquid crystal panel 530 includes a display part 534 and support frame 532 surrounding the display part 534. The display part 534 is exposed through an opening 512 of the front case 510. At the side surface of the rear case 520, a pair of rear screw holes 522 are formed. Similarly, at the side surface of the liquid crystal panel 530, a pair of panel screw holes 532 are formed. The rear case 520 and the liquid crystal display panel 530 are joined to each other by fastening devices such as screws 540 through the rear screw holes and the panel screw holes.

The front case 510 is coupled to the combination member of the rear case 520 and the liquid crystal display panel 530. As shown in FIG. 2, the liquid crystal display device 500 is mounted to base 610 of the portable computer 600. The liquid crystal panel 530 is coupled to the rear case 520 using the screw, which passed through the panel screw holes and the rear screw holes.

As mentioned above, the size of the front and rear case depend on the liquid display panel. For example, when a 12.1" LCD panel is produced, a case designed to fit the 12.1" LCD panel is simultaneously produced to support the 12.1" LCD panel. For the above reason, 12.1" LCD panel is not coupled to a case designed to fit the 13.3" LCD. As the size of the LCD panel is changed, the case corresponding to the size of the LCD panel is individually designed and produced, which prolongs the term of the development time of the new model of the portable computer. Therefore, when cases are changed according to the different sizes of the LCD panels, a raise in the production cost is brought.

Other exemplar art are Itazawa (U.S. Pat. No. 5,631,756, Display Apparatus with Corner Holding Plates, May 20, 1997), Miyamototo et al. (Liquid Crystal Panel Unit Having Liquid Crystal Affixed to Panel Fixing Using Adhesive and Height-Regulating Pins, Dec. 24, 1996), Hasegawa, et al. (U.S. Pat. No. 5,815,224, Liquid Crystal Display Having Video Signal Driving Circuit Mounted on One Side, Sep. 29, 1998), Kim (Method of Mounting Liquid Crystal Display Module and Apparatus Thereof, Feb. 16, 1999), Sasuga et al (U.S. Pat. No. 5,680,183, Structure of Liquid Crystal Display Device for Easy Assembly and Disassembly, Oct. 21, 1997), Horiuchi et al. (U.S. Pat. No. 5,729,310, Lighting Device, Mar. 17, 1998), and Kurihara et al. (U.S. Pat. No. 5,946,061, Fixture and Fixing of LCD Panel, Aug. 31, 1999), Murai (U.S. Pat. No. 5,986,726, Flat Panel Display Device, Nov. 16, 1999). None of the above mentioned patents teach how to avoid having to change the display housing as the liquid crystal display changes size.

SUMMARY OF THE INVENTION

It is therefore an object of the present invention to provide a portable computer capable of using the same rear case irrespective of the size of the display unit.

It is another object to speed up the manufacturing and design process when a new sized liquid crystal display is used.

It is a further object to mount a liquid crystal display easily and efficiently.

It is yet another object to have a stable housing for a display unit while being able to accommodate multiple types of display units.

In order to attain the above objects, according to an aspect of the present invention, there is provided a display unit of a portable computer having a flat panel display including a display zone at a front surface and both side walls having at least one hole thereon, and a lower housing for incorporating the flat panel display. The lower housing has each one of the two side walls having at least one hole corresponding to at least one hole of the flat panel display. An upper housing having an opening for viewing the liquid crystal display is coupled to the lower housing. There is at least one adjusting member for holding the flat panel display. The adjusting member is located between the lower housing and the flat panel display to fill up a gap between the lower housing and the flat panel display. The adjusting member has at least one hole thereon corresponding to at least one hole of the flat panel display. Further, a fixing member is used for holding the lower housing, the adjusting member and the flat panel housing together.

The adjusting member has a first portion arranged in parallel to a side wall of the flat panel display and at least one protrusion formed on a side surface of the first portion. At least one protrusion includes a hole.

Furthermore, in the display unit, the fixing member includes a screw, which is gradually passed through at least one hole of the lower housing and the hole of the protrusion and inserted into the hole of the flat panel display to be coupled to the flat panel display.

BRIEF DESCRIPTION OF THE DRAWINGS

A more complete appreciation of this invention, and many of the attendant advantages thereof, will be readily apparent as the same becomes better understood by reference to the following detailed description when considered in conjunction with the accompanying drawings in which like reference symbols indicate the same or similar components, wherein:

FIG. 5B is a sectional view taken along a line 5b of FIG. 5a;

DETAILED DESCRIPTION OF THE PREFERRED EMBODIMENT

Figure 3:
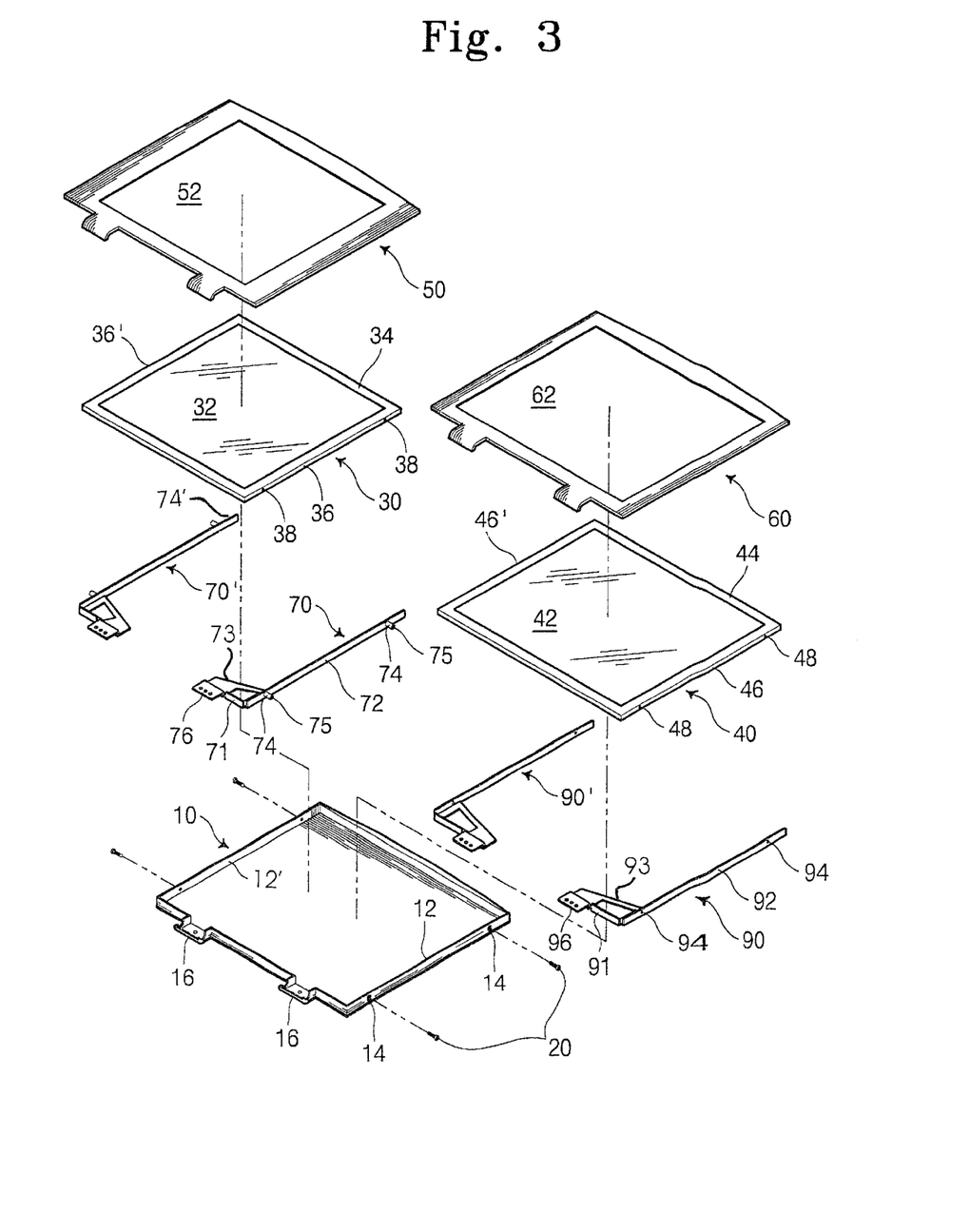
FIG. 3 is an exploded perspective view showing a LCD display unit in accordance with the present invention.
Figure 4A:
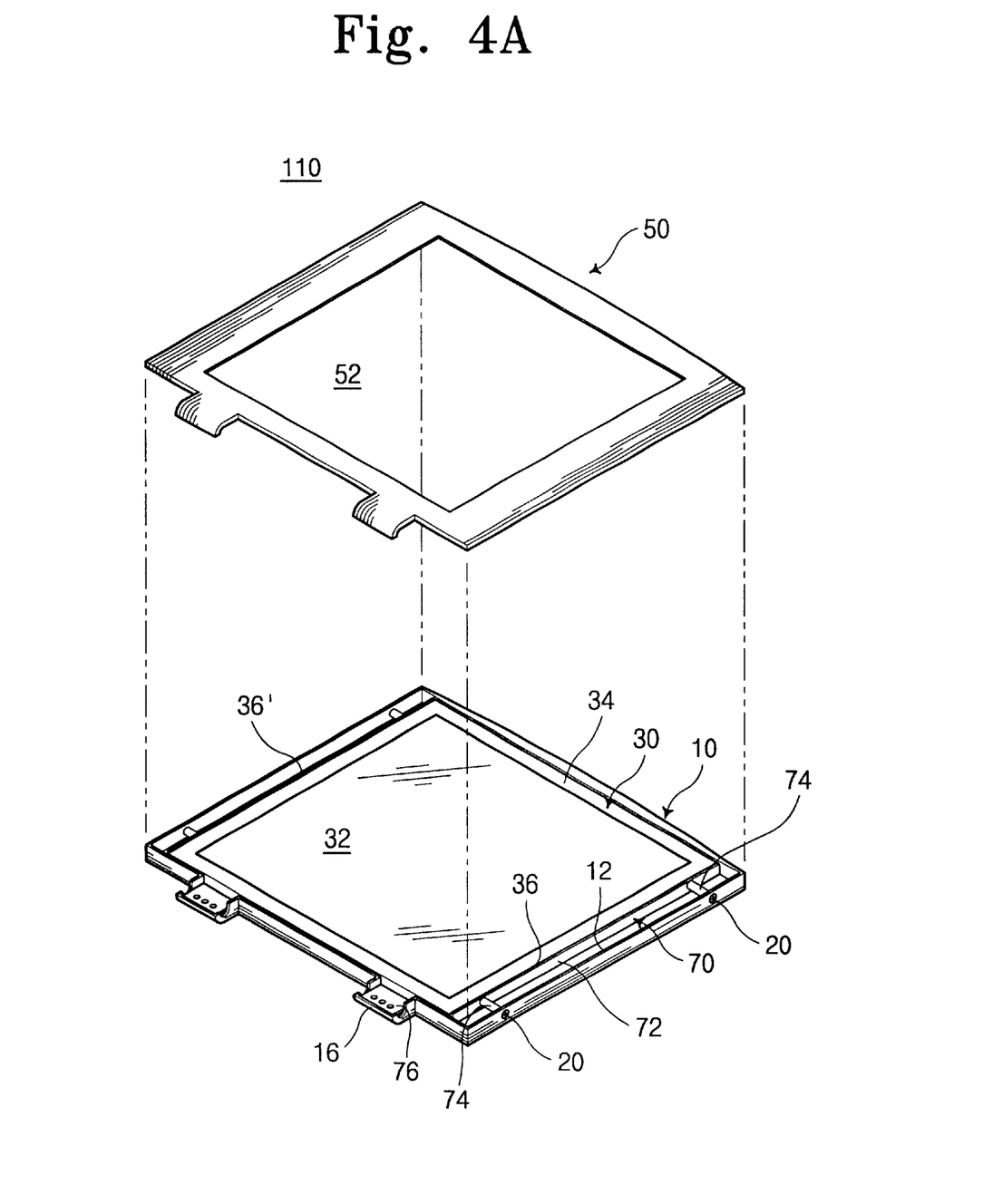
FIG. 4A is an exploded perspective view showing a rear case incorporating a 12.1" LCD display unit using a bracket for 12.1"
Figure 4B:
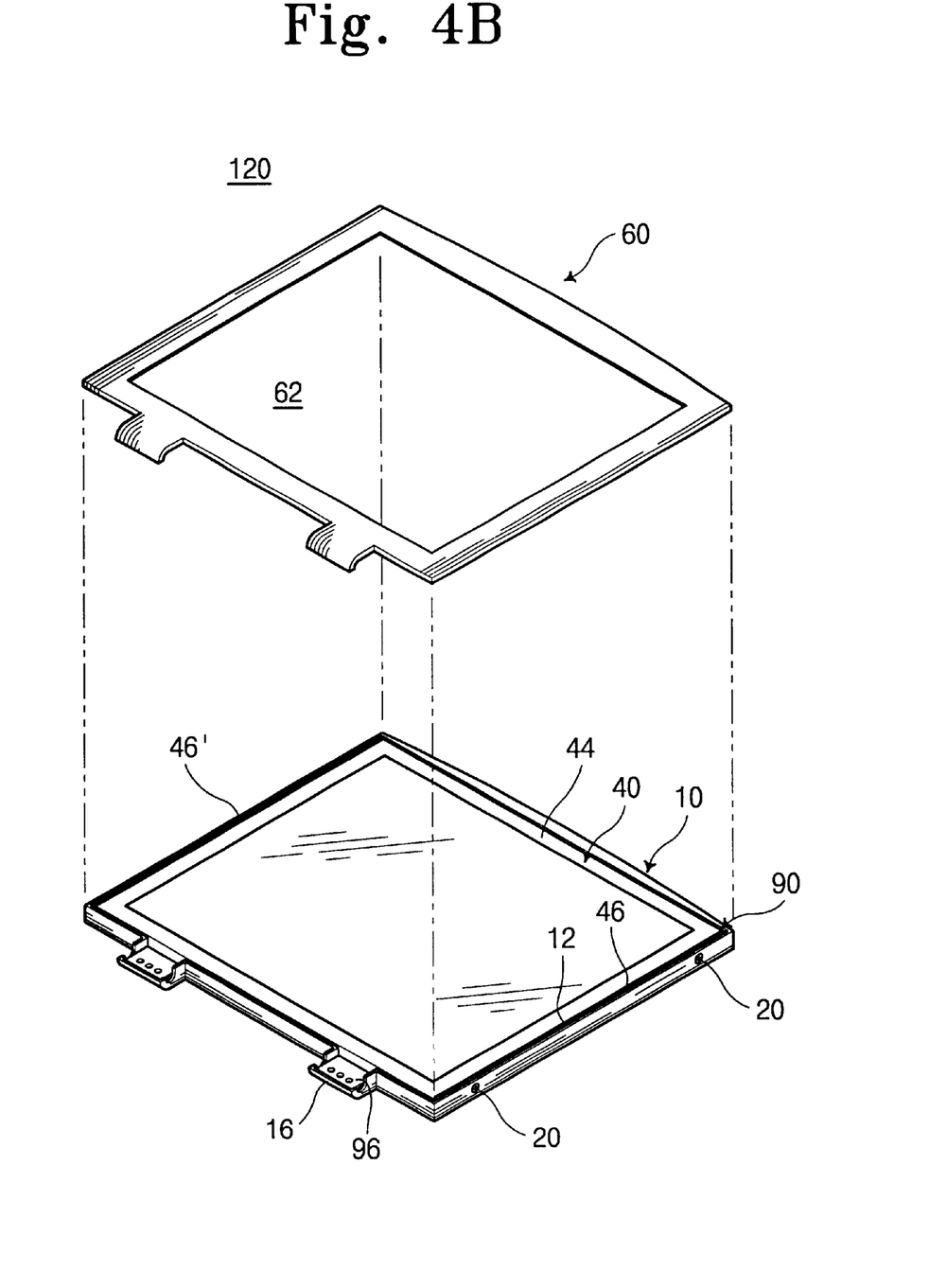
FIG. 4B is an exploded perspective view showing the rear case incorporating a 13.3" LCD display unit using a bracket for 13.3"
Figure 5A:
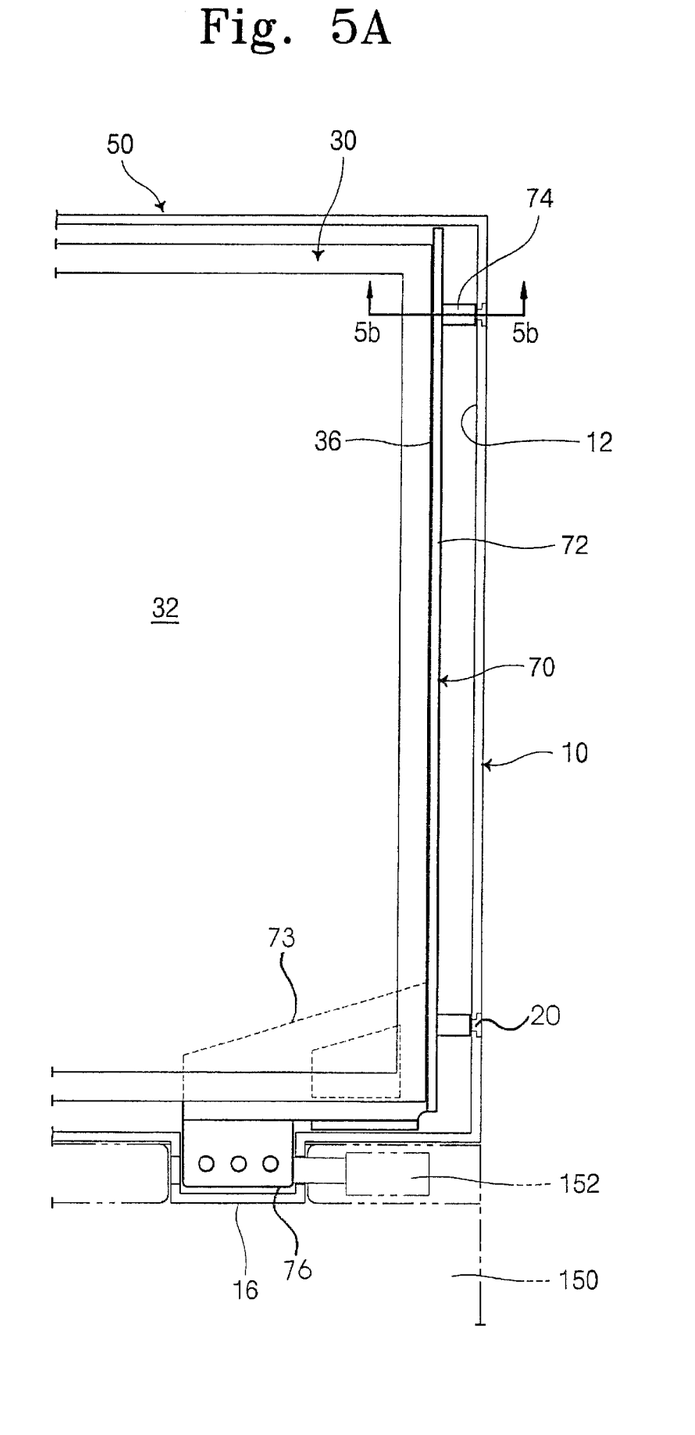
FIG. 5A is a partial plan view showing a rear case incorporating a 12.1" LCD display unit using a bracket for 12.1"

Now, turning to the drawings, a 12.1" (12.1 inches measured diagonally) LCD unit 110 is shown in FIG. 3, 4a and 5a as having a rear case 10, a 12.1" LCD 30, a front case 50 designed for 12.1" and brackets 70 and 70' designed for 12.1". Similarly, a 13.3" LCD unit 120 shown in FIG. 3, 4b and 5b has a rear case 10, a 13.3" LCD 40, a front case 60 designed for 13.3" and brackets 90 and 90' designed for 13.3". Therefore, the front case and the bracket used in the 12.1" LCD and the 13.3" LCD are different, but the same rear case 10 is used in both of the 12.1" LCD unit 110 and the 13.3" LCD unit 120.

The rear case 10 includes side surfaces 12 and 12', which are facing each other. A pair of screw holes 14 are formed on each of the side surfaces 12, 12". A hinge portion 16 for coupling to the base of the portable computer is also formed at the rear case 10. The size of the rear case is designed to fit the largest size among the different sizes of the LCD coupled into the rear case. Because the rear case 10 is designed to fit the 13.3" LCD, the member for filling up a gap of the size is needed. The member for filling up the gap are the brackets 70, 70'. Each one of the brackets 70, 70' includes a first plate (portion) 72 and a second plate (portion) 71. On an outward surface of the first plate 72 are formed a pair of bosses (protrusions) 74. The boss 74 and the first plate 72 may be formed as one body or separate portions.

The shape of bosses 74 is a cylindrical bar, and hole 75 for coupling a screw is formed at each of bosses 74. The second plate 71 has a coupling member 76 inserted into the hinge portion 16 of the rear case 10. A reinforcing member 73 is joined between the first plate 72 and the coupling member 76. The reinforcing member 73 strengthens the brackets 70,70' and provides a support for the bottom corners of the LCD 30.

To obtain the assembly of the 12.1" LCD unit 110, the brackets 70, 70' are inserted into the rear case 10, and each one of the bosses 74 has the hole 75 aligned with the lines passing through the screw hole 14. Then, the 12.1" LCD 30 is inserted into the rear case 10 incorporating the brackets 70 and 70', and a screw 20 is inserted into the screw hole 14 of the rear case 10. The screw 20 is passed through the hole 75 of the bracket 70 and coupled to a screw hole 38 formed on the side surface 36 of the 12.1" LCD 30. Side surface 36' also has a screw hole 38. A display zone 32 is located on the front surface 34 of the 12.1" LCD 30. The display zone 32 can be seen through an opening 52 of the front case 50.

The gap between the rear case 10 designed to fit 13.3" and the 12.1" LCD is supplemented by the length of the bosses 74 of the bracket 70 and bosses 74' of bracket 70'. The usage of bosses 74 conveniently allows the 12.1" LCD to be coupled to the rear case 10 for designed for a 13.3" LCD.

In the mean time, the 13.3" LCD unit 120 includes the front case 60 and the brackets 90 and 90' that are designed to fit a 13.3 inch LCD. As mentioned above, the 13.3" LCD unit 120 is also uses the same rear case 10 that was used with the 12.1" LCD unit 110. The rear case 10 includes side surfaces 12 and 12', that are facing each other. A pair of screw holes 14 are formed on each of side surfaces 12 and 12'. A hinge portion 16 for coupling to the base of the portable computer is also formed at the rear case 10.

Because the rear case 10 is designed to fit the 13.3" LCD, no members such as the bosses 74 of bracket 70 and bosses 74' of bracket 70' are needed to fill any gap between the first plate (portion) 92 of bracket 90 and the side surfaces 12 and 12'. Each one of the brackets 90 and 90' includes a first plate 92 and a second plate 91. On an outward surface of the first plate 92 are formed holes 94 for coupling a screw. The second plate 91 has a coupling member 96 inserted into the hinge portion 16 of the rear case 10. A reinforcing member 93 is joined between the first plate 92 and the coupling member 96. The reinforcing member 93 strengthens the brackets 90,90' and provides a support for the bottom corners of the LCD 40.

To obtain the assembly of the 13.3" LCD unit 120, the brackets 90 and 90' are inserted into the rear case 10, and the hole 94 is aligned with the line passing through the screw hole 14. Then, the 13.3" LCD 40 is inserted into the rear case 10 incorporating the bracket 90, and a screw 20 is inserted into the screw hole 14 of the rear case 10. The screw 20 is passed through the hole 94 of the bracket 90 and coupled to a screw hole 48 formed on the side surfaces 46 and 46' of the 13.3" LCD 40. A display zone 42 is located on the front surface 44 of the 13.3" LCD 40. The display zone 42 can be seen through an opening 62 of the front case 60.

As mentioned above, LCD units 110, 120 are coupled to the same rear case 10. By using different brackets, it is possible to couple the LCD having a different size to the same rear case. Using the same case irrespective of size of the LCD makes a reduction of developing time and a cost.

By using various methods, the rear case may be produced. Through injection process or die casting process, the rear case 10 may be produced to have components of plastic, aluminum alloy and zinc alloy.

Figure 5B:
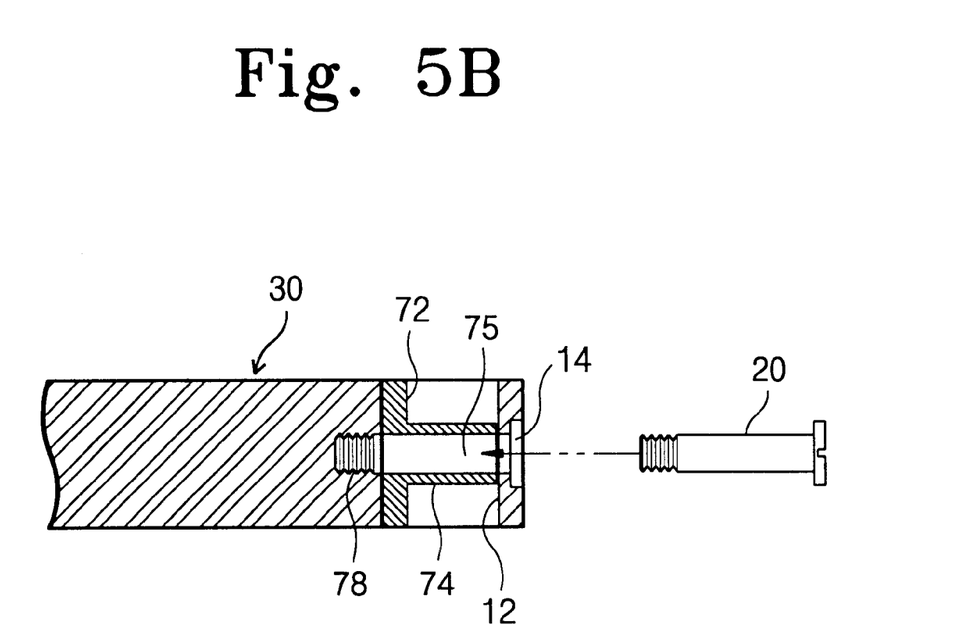
Figure 5C:
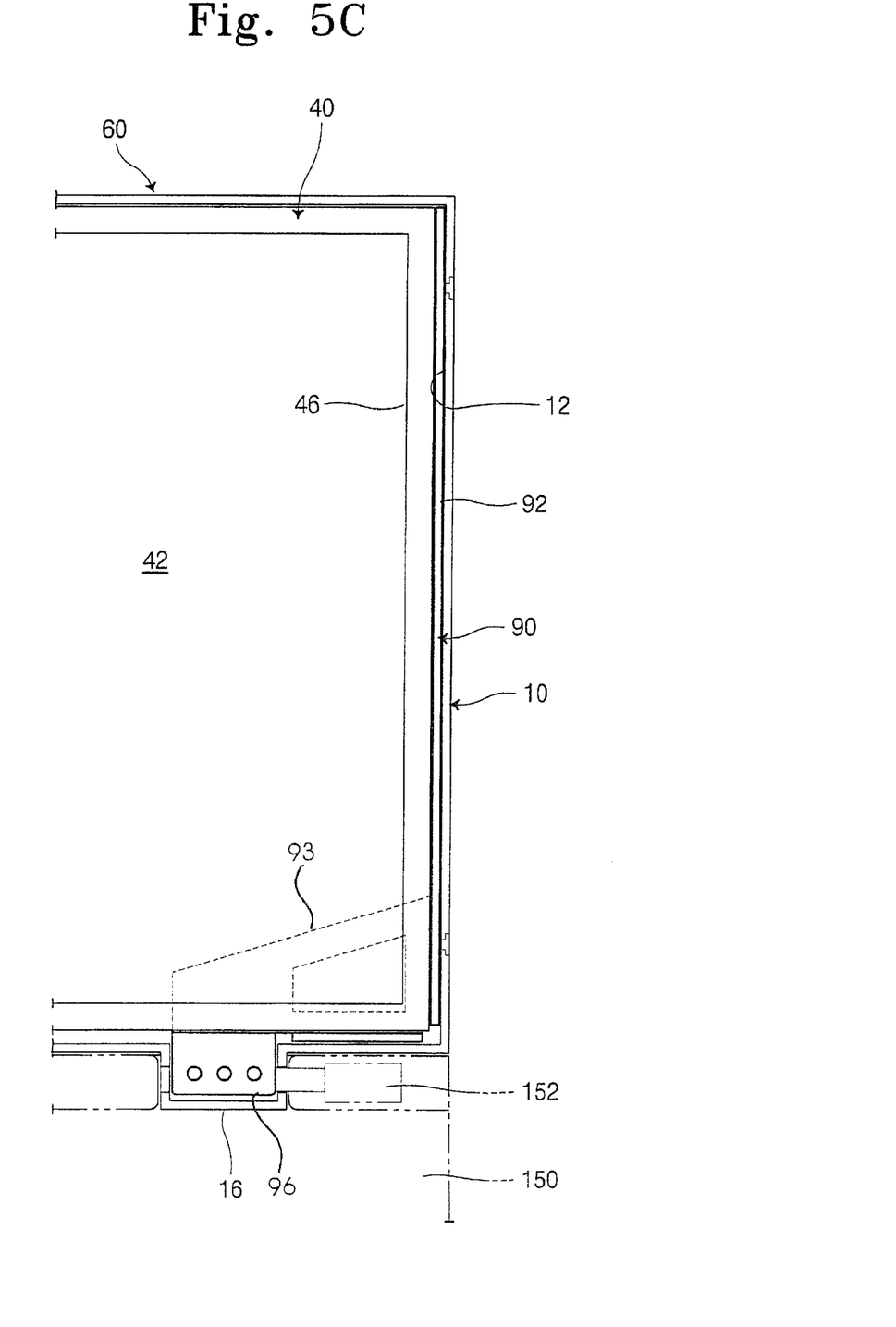
FIG. 5C is a partial plan view showing the rear case incorporating a 13.3" LCD display unit using a bracket for 13.3"

In the boss 74 shown in the FIGS. 5A and 5B, the hole 75 is formed to be coupled with the screw 20. An inner surface of the hole 75 may also be tapped 78 to be firmly coupled to the screw 20 in another embodiment of the present invention.

Figure 6:
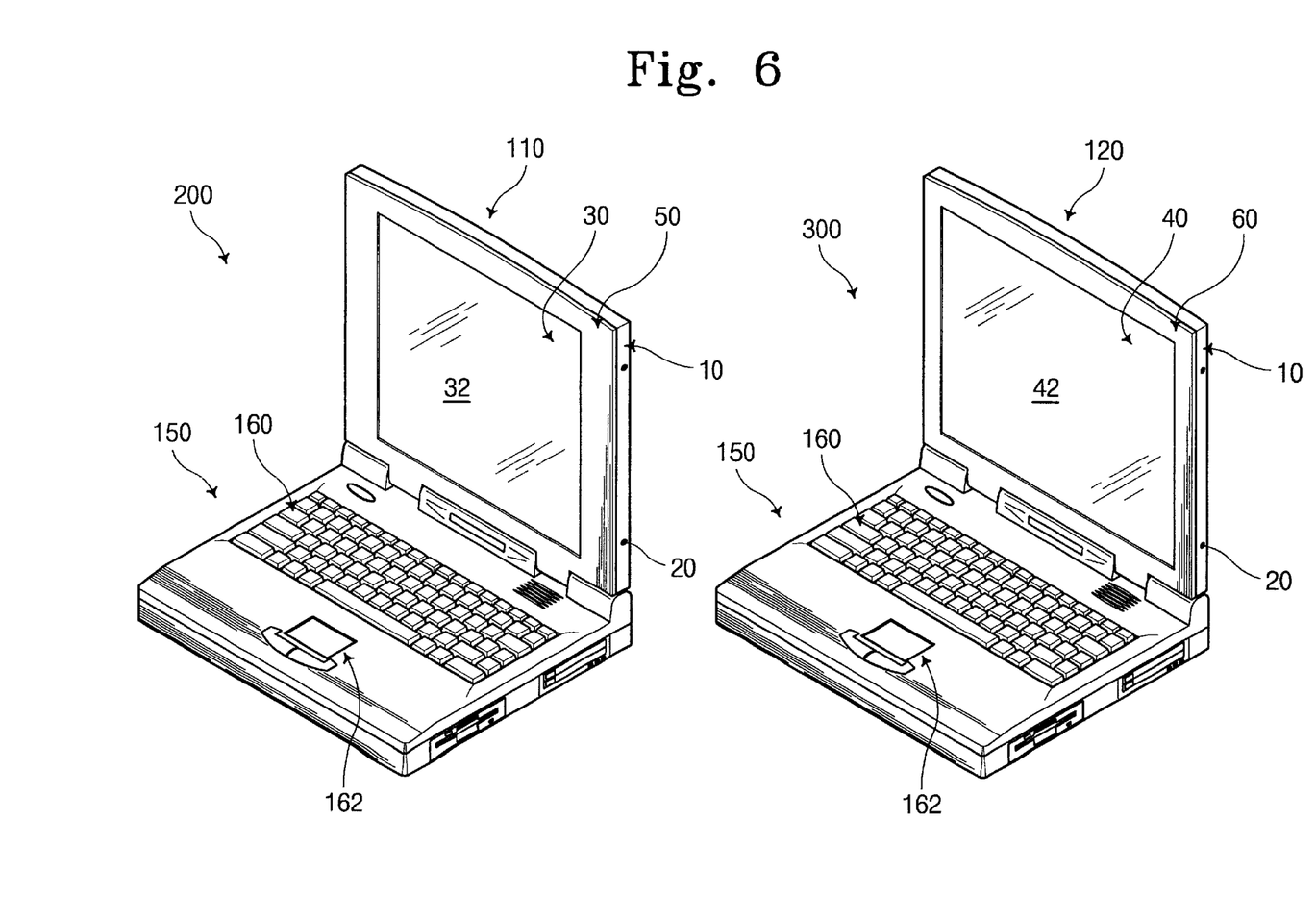
FIG. 6 is a perspective views of the first portable computer coupled to the LCD display unit using the bracket for 12.1" and the second portable computer coupled to the LCD display unit using the bracket for 13.3".

FIG. 6 shows a portable computer, especially a notebook computer, having the mentioned LCD units according to the present invention. The 12.1" LCD unit 110 is mounted on a base 150 of the portable computer 200. The 13.3" LCD unit 120 is mounted on a base 150 of the portable computer 300 The base includes a keyboard 160 and a pointing device 162. Not shown in FIG. 6, the coupling member 76, 96 is connected with hinge shaft 152, allowing the LCD units 110, 120 to pivotally rotate.

The invention has been described using exemplary preferred embodiments. However, it is to be understood that the scope of the invention is not limited to the disclosed embodiments. On the contrary, it is intended to cover various modifications and similar arrangements. The scope of the claims, therefore, should be accorded the broadest interpretation so as to encompass all such modifications and similar arrangements.

What is claimed is:

1. A display unit of a portable computer, comprising:
   a display being a flat panel having a front surface providing variable video display and both side walls having at least one first hole;
   a rear case incorporating said display, said rear case including both side walls corresponding to the side walls of said display, each one of the two side walls of said rear case having at least one second hole corresponding to at least one first hole of said display;
   a pair of support members holding said display and located between said rear case and said display, said support members having at least one third hole corresponding to at least one of the first holes of said display, each of said supporting members including at least one protrusion having the third hole; and
   a plurality of fixing members holding said display with said rear case, one of said fixing members inserted into the second hole of said rear case and coupled to the first hole of said display through the third hole of said supporting member.

2. The display unit of claim 1, wherein each of said supporting members further comprising:
   a first portion arranged in parallel to the side wall of said display;
   the third hole formed on a side surface of said first portion, said at least one protrusion filling up a gap between said rear case and said display; and
   a second portion perpendicular to said first portion supporting said display.

3. A display unit of a portable computer, comprising:
   a display being a flat panel having a front surface providing variable video display and both side walls having at least one first hole;
   a rear case incorporating said display, said rear case including both side walls corresponding to the side walls of said display, each one of the two side walls of said rear case having at least one second hole corresponding to at least one first hole of said display;
   a pair of support members holding said display and located between said rear case and said display, said support members having at least one third hole corresponding to at least one of the first holes of said display; and
   a plurality of fixing members holding said display with said rear case, one of said fixing members inserted into the second hole of said rear case and coupled to the first hole of said display through the third hole of said supporting member,
   wherein each of said supporting members comprising a first portion arranged in parallel to a side wall of said display and a second portion disposed to be perpendicular to the first portion to support said display,
   wherein said supporting members having at least one protrusion inserted to fill up a gap when a size of said display is smaller than a size of an inner space of said rear case.

4. The display unit of claim 3, wherein said supporting members having only a first portion inserted between said display and said rear case when a size of said display is nearly equal to a size of an inner space of said rear case.

5. The display unit of claim 4, wherein said second portion further comprising a coupling member inserted into a hinge portion of said rear case, said coupling member connected with a hinge shaft allowing said display unit to pivotally rotate with a main body of the portable computer, the main body having on an external portion a keyboard, pointing device and internally having electronic components controlling the portable computer.

6. The display unit of claim 5, wherein an inner surface of the third hole of said supporting member is tapped to allow a firm coupling with said fixing member.

7. The display unit of claim 6, wherein said supporting members further comprising a reinforcing member joined between said first portion and said coupling member, said reinforcing member strengthening said supporting members and supporting bottom corners of said display.

8. A display unit of a portable computer, comprising:
   a display being a flat panel having a front surface providing variable video display and both side walls having at least one first hole;
   a rear case incorporating said display, said rear case including both side walls corresponding to the side walls of said display, each one of the two side walls of said rear case having at least one second hole corresponding to at least one first hole of said display;
   a pair of support members holding said display and located between said rear case and said display, said support members having at least one third hole corresponding to at least one the first holes of said display;
   at least one protrusion having the third hole forming on a side surface of said support member when there is a gap between the side walls of said display and the side walls of said rear case, said protrusion filling the gap between said rear case and said display; and
   a plurality of fasteners holding said display with said rear case, one of said fasteners inserted into the second hole of said rear case and coupled to the first hole of said display through the third hole of said supporting member.

9. The display unit of claim 8, wherein each of said supporting members further comprising:
   a first portion arranged in parallel to the side wall of said display; and
   a second portion perpendicular to said first portion supporting said display.

10. The display unit of claim 9, wherein said protrusion forming on a side surface of said first portion.

11. The display unit of claim 8, wherein said supporting members having only a first portion inserted between said display and said rear case when there is substantially no gap between the side walls of said display and the side walls of said rear case.

12. The display unit of claim 8, wherein said second portion further comprising a coupling member inserted into a hinge portion of said rear case, said coupling member connected with a hinge shaft allowing said display unit to pivotally rotate with a main body of the portable computer, the main body on an external portion having a keyboard, pointing device and internally having electronic components controlling the portable computer.

13. The display unit of claim 8, wherein an inner surface of the third hole of said supporting member is tapped to allow a firm coupling with said fastener.

14. The display unit of claim 9, wherein said supporting members further comprising a reinforcing member joined between said first portion and said coupling member, said reinforcing member strengthening said supporting members and supporting bottom corners of said display.

15. A method, comprising the steps of:

forming a display into a flat panel having a front surface providing variable video display and both side walls having at least one first hole;

forming a rear case incorporating said display, said rear case including both side walls corresponding to the side walls of said display, each one of the two side walls of said rear case having at least one second hole corresponding to at least one first hole of said display;

forming a pair of support members with at least one third hole;

forming at least one protrusion having the third hole on a side surface of said support member when there is a gap between the side walls of said display and the side walls of said rear case, said protrusion filling the gap between said rear case and said display;

inserting said pair of support members into said rear case;

aligning at least one third hole of said supporting member to at least one of the first holes of said display;

inserting said display into said rear case incorporating said pair of support members; and inserting a fastener into the second hole of said rear case, through the third hole of said support member and coupling to the first hole formed on the side wall of said display.

16. The method of claim 15, wherein forming said supporting members further comprising the steps of:

arranging a first portion in parallel to the side wall of said display;

forming a second portion perpendicular to said first portion supporting said display; and joining a reinforcing member between said first portion and said coupling member, said reinforcing member strengthening said supporting members and supporting bottom corners of said display.

17. The method of claim 16, wherein said second portion further comprising a coupling member inserted into a hinge portion of said rear case, said coupling member connected with a hinge shaft allowing said display unit to pivotally rotate with a main body of the portable computer, the main body on an external portion having a keyboard, pointing device and internally having electronic components controlling the portable computer.

18. The method of claim 15, wherein said supporting members having only a first portion inserted between said display and said rear case when there is no gap between the side walls of said display and the side walls of said rear case.

19. The method of claim 15, wherein an inner surface of the third hole of said supporting member being tapped to allow a firm coupling with said fastener.

* * * * *